(12) United States Patent (10) Patent No.: US 8,814,115 B2
Muday et al. (45) Date of Patent: Aug. 26, 2014

(54) MOUNTING SYSTEM FOR FLAT PANEL DISPLAY

(75) Inventors: Tom Muday, Scottsdale, AZ (US);
Zachary Eyman, Phoenix, AZ (US);
Brett Stenhouse, Phoenix, AZ (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 12/779,796

(22) Filed: May 13, 2010

(65) Prior Publication Data

US 2010/0219315 A1 Sep. 2, 2010

Related U.S. Application Data

(62) Division of application No. 11/514,716, filed on Aug. 31, 2006, now Pat. No. 7,731,143.

(51) Int. Cl.
*E04G 3/00* (2006.01)
(52) U.S. Cl.
USPC .................. 248/284.1; 248/274.1; 248/279.1; 248/286.1; 248/923
(58) Field of Classification Search
USPC ........... 248/284.1, 274.1, 278.1, 289.11, 242, 248/244, 480, 371, 372.1, 393, 395, 398, 248/917, 919, 309.1, 279.1, 286.1, 923
See application file for complete search history.

(56) References Cited

U.S. PATENT DOCUMENTS

| | | | |
|---|---|---|---|
| 6,402,109 B1 * | 6/2002 | Dittmer | 248/284.1 |
| 7,063,295 B2 * | 6/2006 | Kwon | 248/276.1 |
| 7,175,146 B2 * | 2/2007 | Kim | 248/279.1 |
| 7,445,187 B2 | 11/2008 | Shin | 248/324 |
| 7,537,189 B2 * | 5/2009 | Jung et al. | 248/298.1 |
| 7,731,143 B2 * | 6/2010 | Muday et al. | 248/284.1 |
| 2004/0232298 A1 * | 11/2004 | Bremmon et al. | 248/281.11 |
| 2005/0283953 A1 | 12/2005 | Jeffrey | 24/303 |
| 2006/0291152 A1 * | 12/2006 | Bremmon | 361/681 |
| 2007/0007412 A1 | 1/2007 | Wang | 248/284.1 |
| 2007/0023599 A1 * | 2/2007 | Fedewa | 248/284.1 |

* cited by examiner

*Primary Examiner* — Todd M Epps
(74) *Attorney, Agent, or Firm* — Schwegman Lundberg & Woessner, P.A.

(57) ABSTRACT

A mounting system for adjustably mounting a flat panel display to a support medium. The system consists of a frame assembly that can be attached to a support medium. One or more adjustable mounts are attached to the frame assembly, and a flat panel display is attached to the adjustable mounts. Each adjustable mount can extend from a retracted position to an extended position in order to tilt the flat panel display and provide an optimum viewing angle to a viewer. As the adjustable mount extends, the center of gravity of the attached flat panel display moves in approximately a horizontal plane, enabling the display to be tilted by a user with a minimum amount of applied force. In some embodiments, a friction assembly is provided to maintain the selected position of each adjustable mount.

23 Claims, 4 Drawing Sheets

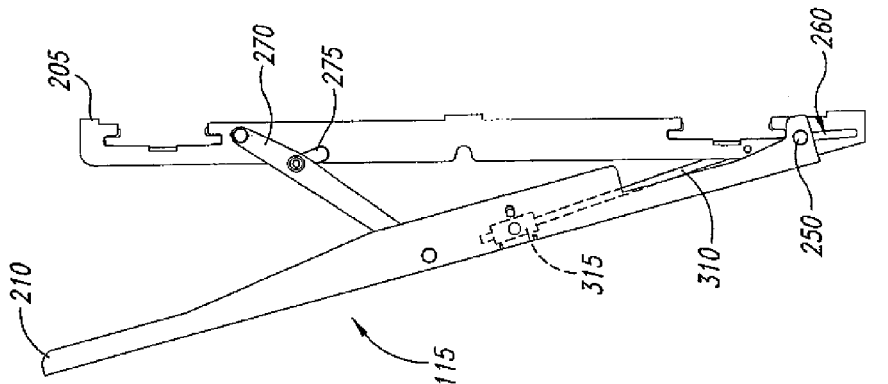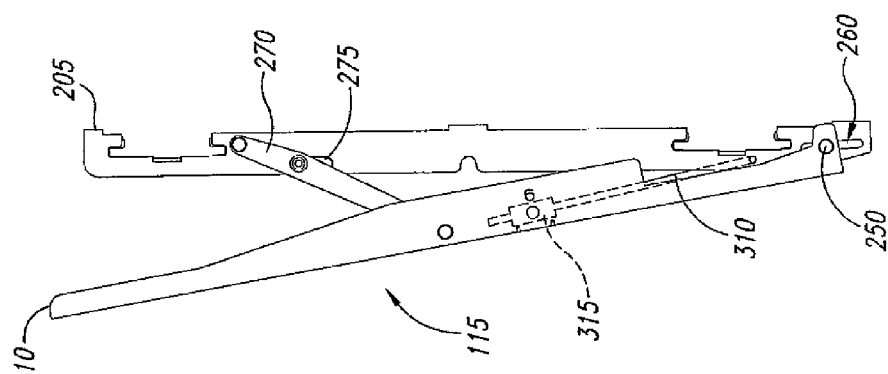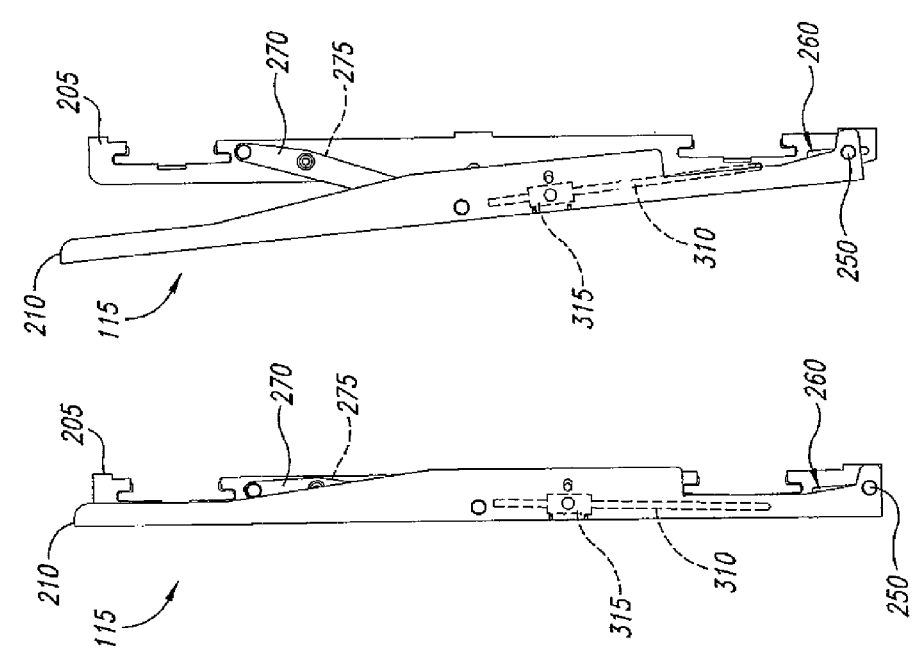

MOUNTING SYSTEM FOR FLAT PANEL DISPLAY

CROSS-REFERENCE TO THE RELATED APPLICATIONS

This application is a divisional of application Ser. No. 11/514,716, filed on Aug. 31, 2006, the entire contents of which are incorporated herein by reference.

TECHNICAL FIELD

The present invention is related to systems for mounting flat panel displays to support mediums.

BACKGROUND

Flat panel video displays, such as plasma displays, liquid crystal displays, digital light processing displays, e-ink displays, and other existing and developing display technologies, are becoming increasingly popular because of their smaller profile when compared to traditional video displays using cathode ray tubes. As a result, flat panel displays are being used more frequently in a number of applications, including in the home, in corporate meeting rooms, in manufacturing facilities, in museums, in public spaces, and in a variety other uses. Because of the large number of flat panel display manufacturers, the range of panel sizes, and the significantly different applications in which flat panels are being used, a number of different mounting systems and mounting techniques have been developed to secure flat panel displays to walls or other support mediums. Mounting systems run the gamut from simple fixed brackets to motorized systems for raising and lowering flat panel displays from decorative cabinets.

Most traditional mounting devices for flat panel displays allow a user to tilt or otherwise adjust the relative position of the display for optimum viewing performance. One of the disadvantages of many of the existing mounting devices, however, is the amount of force required to adjust the position of the flat panel display. Particularly as flat panel displays become larger and heavier, the amount of force necessary to orient displays has become increasingly an issue with some mounting devices. Since many uses of a flat panel display require frequent adjustments to the position of the display, it would be beneficial to develop a mounting system that would minimize the force necessary to position the flat panel display and reduce the force required to hold the flat panel display in the desired position after adjustment.

BRIEF DESCRIPTION OF THE DRAWINGS

FIGS. 3A-3D are side views of the adjustable mount of FIG. 2 as the adjustable mount extends from a retracted position to an extended position.

DETAILED DESCRIPTION

Figure 1A:
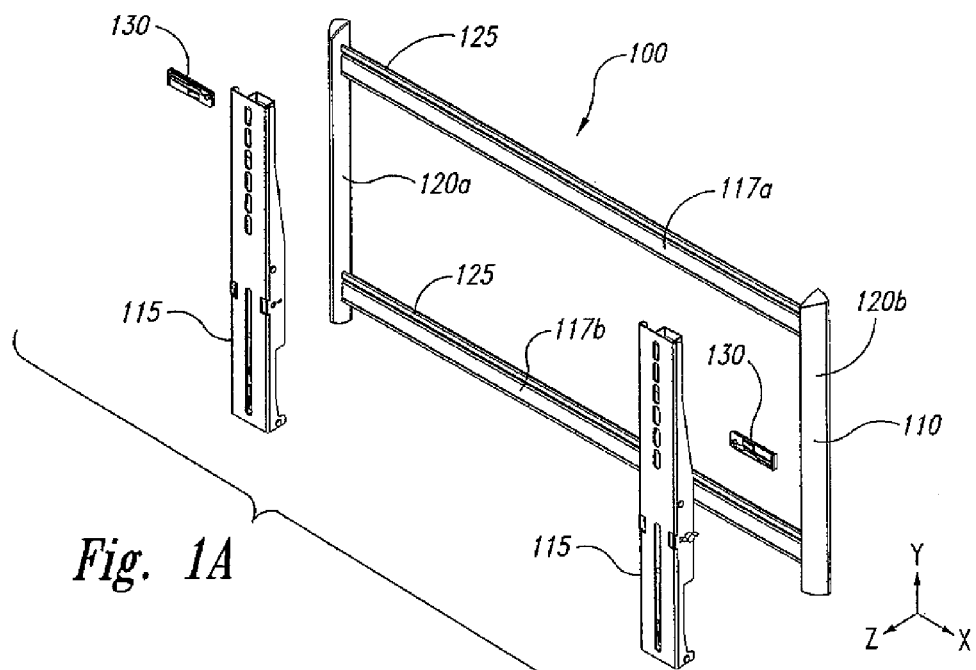
FIGS. 1A and 1B are isometric views of a system for adjustably mounting a flat panel display to a support medium, including two adjustable mounts and one frame assembly.
Figure 1B:
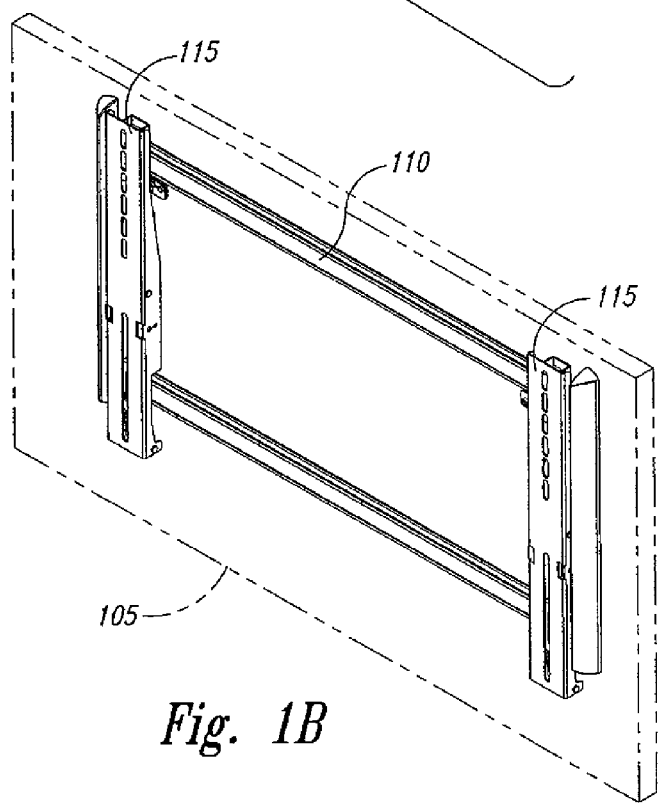

FIGS. 1A and 1B are isometric views of a mounting system 100 for adjustably mounting a flat panel display 105 (shown in broken lines) to a support medium (not shown). The system consists of a frame assembly 110 that can be attached to a wall, column, bracket, or any other structure that may act as a support medium. One or more adjustable mounts 115 are attached to the frame assembly 110, and a flat panel display 105 is attached to the adjustable mounts. The mounting system 100 is designed to allow significant flexibility in placing and orienting the attached flat panel display. For example, the frame assembly may be mounted to a support medium at a desired vertical height. The adjustable mounts may be moved laterally on the frame assembly to allow the flat panel to be positioned at a desired horizontal location. And, as will be described in greater detail below, each adjustable mount 115 can extend from a retracted position to an extended position in order to tilt the flat panel display and provide an optimum viewing angle to a viewer. As the adjustable mount extends, the center of gravity of the attached flat panel display moves in an at least approximately horizontal plane. Since the center of gravity of the display does not move up or down along a circular arc as the adjustable mount extends, the display may be tilted by a user with less force than with mounting systems that pivot the display along a circular arc. In some embodiments, a friction assembly is provided to maintain the selected position of each adjustable mount. The friction assembly is simple to manufacture and adjust. The disclosed mounting system is therefore easy to use and suitable for a variety of different applications.

With reference to FIG. 1A, the frame assembly 110 is comprised of a top rail 117A, a bottom rail 117B, a left support 120A, and a right support 120B. In some embodiments, the top and bottom rails are fixed to the left and right supports in a roughly rectangular configuration. The left and right supports 120A, 120B maintain the spacing of the top and bottom rails 117A, 117B so that they are at least substantially parallel with one another and at a distance that accommodates attachment of the adjustable mounts. The frame assembly is screwed or otherwise attached to the support medium using a plurality of fasteners (not shown) that will support the weight of the frame assembly 110, adjustable mounts 115, and flat panel display 105. It will be appreciated that the left and right supports for the frame assembly facilitate the installation of the mounting system, as an installer mounting the frame assembly to the support medium does not have to ensure that the top and bottom rails are correctly spaced. In other embodiments, however, the left and right supports may be omitted, and the mounting system installer may mount the rails 117A and 117B directly to the support medium at the appropriate distance and orientation. Those skilled the art will appreciate that other configurations for the frame assembly 110 may also be used in order to maintain the proper spacing and orientation of the top and bottom rails.

The top and bottom rails 117A and 117B can be formed of aluminum, steel, plastic, or other material that has sufficient strength to support the weight of the attached adjustable mounts and flat panel monitor. In the illustrated embodiment, the top of each of the rails is formed with a lip 125 that runs the length of the rail along the proximal edge of the rail from the perspective of the installer mounting the frame assembly. Because the lip 125 of each rail is spaced away from the support medium to which the frame assembly is attached, the adjustable mounts 115 can be hung from the top and bottom rails 117A and 117B as will be described in greater detail below. The adjustable mounts can also be slid laterally along the rails to allow the flat panel display to be horizontally positioned within a range of motion defined by the length of the top and bottom rails. The adjustable mounts are attached to the rear of a flat panel display 105 using one or more fasteners (not shown) that mate with any mounting holes, brackets, or couplers that are provided by the flat panel display manufacturer. FIG. 1B depicts two adjustable mounts 115 that have been attached to the flat panel display 105 and hung from the frame assembly 110. It will be appreciated that depending on the size of the flat panel display that is being mounted, a greater or lesser number of adjustable mounts may be required to support the weight and size of the display.

Figure 2:
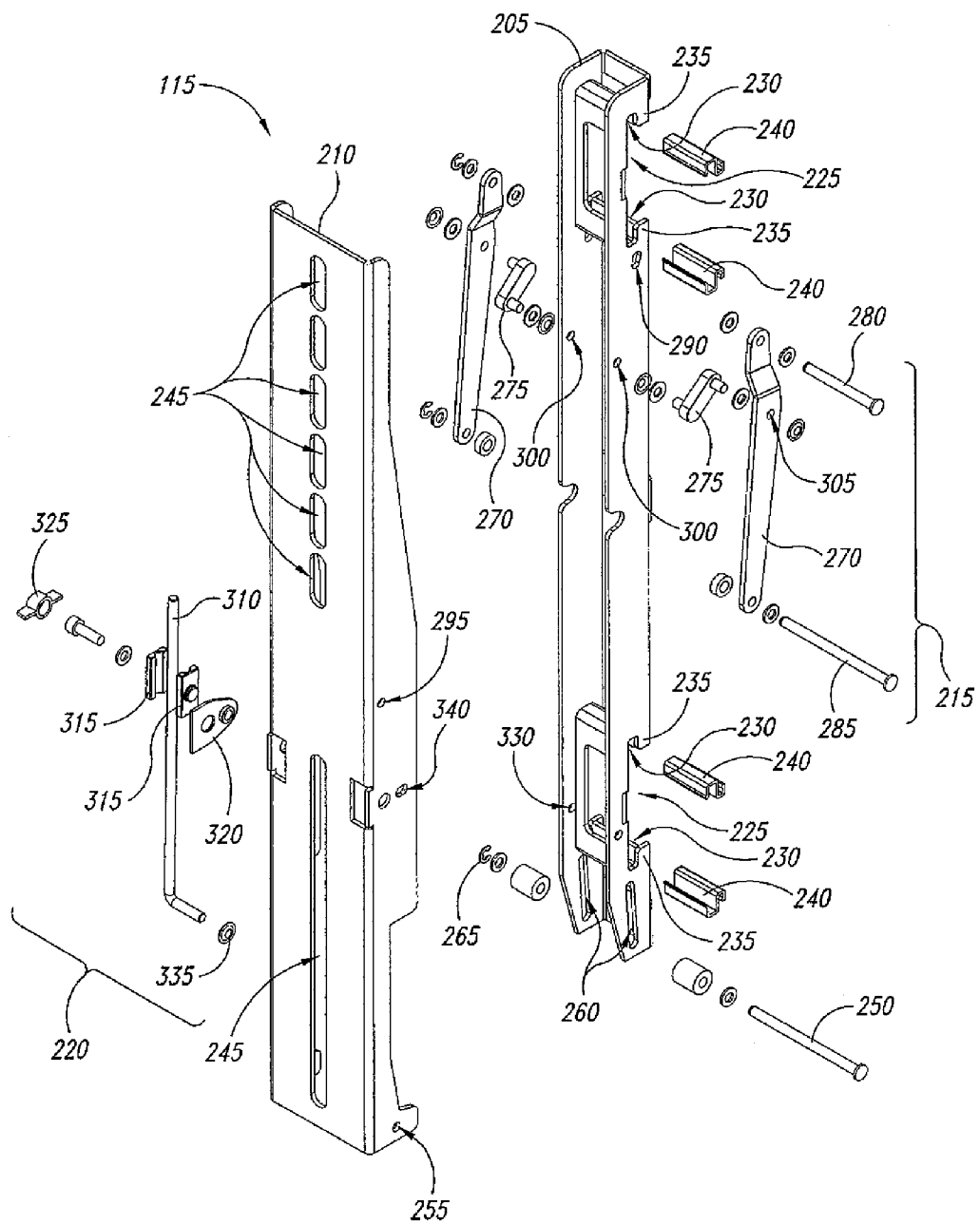
FIG. 2 is an exploded isometric view of a adjustable mount that may be attached to the frame assembly.

FIG. 2 is an exploded isometric view of a adjustable mount 115 that is used to hang the flat panel display 105 from the frame assembly 110. The adjustable mount 115 is comprised of a back body portion 205 and a front body portion 210 that are coupled by a linkage assembly 215 that allows the front body portion to move through a range of motion that will be described in additional detail below. The adjustable mount also includes a friction assembly 220 that enables the adjustable mount to maintain a particular position within its range of motion without adjustment by the user. In some embodiments, the adjustable mount 115 enables an attached flat panel display to be tilted at an angle of between 0 to 15 degrees as measured from the frame assembly 110.

The back body portion 205 of the adjustable mount is generally manufactured of aluminum, steel, plastic, or other material that has sufficient strength to support the weight of the flat panel monitor. The back body portion can be formed with two "T-shaped" slots 225 at either end of the body portion. The slots are oriented towards the rear of the mounting system, and are sized to fit over the top rail 117A and bottom rail 117B. The sides of each slot define a groove 230 and a flange 235 on the back body portion, one groove/flange in each slot oriented upwards and one groove/flange oriented downwards when the adjustable mount is vertically oriented. The downwardly-oriented groove 230 is sized to receive the lip 125 of the corresponding top or bottom rail 117A or 117B and connect the adjustable mount 115 to the frame assembly 110. The weight of the flat panel 105 results in sufficient pressure between the flange 235 and the lip 125 to secure the connection. In some embodiments, nylon rail glides 240 are inserted into the slots 225 to cover the surface of the flange and the corresponding groove that receives the lip. The nylon rail glides make it easier to slide the adjustable mount along the frame assembly, protects the finish of the adjustable mount and frame assembly, and may provide some "stickiness" in the flange/lip connection to prevent the flat screen from moving as a result of inadvertent jostling. Note that the downwardly-oriented grooves 230 and flanges 235 are utilized to secure the adjustable mount to the frame assembly. The upwardly-oriented grooves and flanges are provided to allow the adjustable mount to be rotated 180 degrees and attached to the frame assembly. In one orientation (depicted), the adjustable mount allows the flat panel to be tilted away from the frame assembly and downwardly towards a viewer. In the other orientation with the adjustable mount rotated 180 degrees (not shown), the adjustable mount allows the flat panel to be tilted away from the frame assembly and upwardly towards a viewer. The slots are therefore configured to maximize the flexibility of the adjustable mount.

The front body portion 210 is sized to encompass the back body portion 205 and the linkage assembly 215 when the adjustable mount 115 is in the retracted position. A plurality of slots 245 are provided on the front body portion to secure the front body portion to a flat panel monitor using a plurality of fasteners (not shown). The slots are preferably sized to enable the adjustable mount to be attached to flat panels manufactured by a variety of manufacturers. The front body portion is constructed of aluminum, steel, plastic, or other material that has sufficient strength to support the weight of the flat panel monitor.

The front body portion 210 is coupled to the back body portion 205 at two connection points. At a first connection point, a pin 250 passes through a hole 255 in the front body portion, through slots 260 in the back body portion, and through a corresponding second hole (not shown) in the front body potion. The pin is secured by an e-clip 265 or other retainer. Since the pin passes through slots 260 in the back body portion, the first connection point of the front body portion 210 to the back body portion 205 is allowed to float within a range of motion defined by the slots. That is, the body of the pin can slide upward and downward within the slots 260 as the front body portion tilts relative to the back body portion. While the slots 260 are depicted as straight in FIG. 2, it will be appreciated that the slots may be curved or may have a different shape.

The front body portion 210 is coupled to the back body portion 205 at a second connection point by the linkage assembly 215. The linkage assembly includes a pair of first links 270 and a pair of second links 275. The pair of first links 270 are positioned on opposite sides of the back body portion 205. A pin 280 passes through an end of one of the first links 270, through a pair of small slots 290 in the back body portion 205, and through a corresponding end of the other of the first links 270, thereby securing both first links to the back body portion. The pin 280 is secured in place by an e-clip or other fastener, and is allowed to float within a range of motion defined by the slots 290 as the front body portion tilts relative to the back body portion. The other ends of the first links 270 are secured to the front body portion 210. A pin 285 passes through a hole 295 in the front body portion, through the end of one of the first links 270, through the end of the other first link 270, and through a corresponding hole (not shown) in the front body portion. The pin 285 is secured by an e-clip or other fastener. The linkage assembly 215 can further include second links 275 pivotally attached to the back body portion 205 and pivotally attached to a corresponding first link 270.

By virtue of the first links 270 being attached to the back body portion 205 and the front body portion 210, the front body portion is allowed to move relative to the back body portion, thereby tilting the attached flat panel display towards or away from a viewer. To maintain the center of gravity of the flat panel display in a more horizontal plane, the pair of second links 275 are connected between the back body portion 205 and a point on the pair of first links 270 between the points where the first links are coupled to the front and back body portions. Specifically, one end of each second link is coupled to the back body portion 205 by a pin that extends through a hole 300 in the back body portion. The other end of each second link is connected to the first link by a pin that extends through a hole 305 in the first link. The hole 305 is located on the first link roughly one-quarter of the distance between the points where the first link is coupled to the body portions, as measured from the coupling point with the back body portion. When the linkage assembly is configured in this manner, the path of the center of gravity of the display more closely approximates a horizontal line as the front body portion pivots outward. Specifically, as the bottom pivot points of the first links 270 move outward, the second links 275 are driven in an arc in the opposite direction. Pin 250 slides in slots 260 and pin 280 slides in slots 290 to accommodate this motion. The arc of the second links 275 alters the path of the first links 270 so that the path traced by the bottom pivot points of the first links 270 is roughly a straight line, or along a curve that is not a circular arc. FIGS. 3A-3D depict the motion of the front body portion and the back body portion as the front body portion tilts outwardly from the back body portion.

FIGS. 3A-3D are side views of the adjustable mount 115 as the adjustable mount extends from a retracted position to an extended position. FIG. 3A depicts the adjustable mount when retracted. Provided that the adjustable mount was attached to a vertical frame assembly, in this position an attached flat panel monitor is oriented vertically with no angle of tilt (zero degrees). In the retracted position, the second link 275 is angled away from the front body portion 210. The pin 250 representing the lower pivot point between the front and back portions of the adjustable mount is resting at or near the bottom of the slot 260. FIG. 3B depicts the adjustable mount as the front body portion 210 is beginning to be tilted away from the back body portion 205. One end of the second link 275 has started to pivot upwards, causing the lower end of the first link 270 to move in roughly a straight line. As this is occurring, the pivot point represented by the pin 250 has moved upward in slot 260. FIG. 3C depicts the point where movement of the second link 275 has the maximum corrective effect as the second link 275 reaches a vertical position. As noted above, by correcting the motion of the first link 270, the amount of effort to move the attached flat screen is minimized because the center of gravity of the attached flat screen display is moved in an at least substantially horizontal plane. As the front body portion 210 continues to be tilted away from the back body portion 205, the pin 250 continues to move upward in the slot 260. FIG. 3D depicts the adjustable mount in the fully-extended position. Provided that the adjustable mount was attached to a vertical frame assembly, in this position an attached flat panel monitor is oriented at a fifteen degree (15°) angle of tilt. In this position, the second link 275 is now angled toward the front body portion 210. The pin 250 representing the lower pivot point between the front and back portions of the adjustable mount is resting at or near the top of the slot 260. While a 0-15 degree angle of tilt was found to be sufficient for most applications involving flat screen displays, those skilled in the art will appreciate that various modifications may be made to the linkage assembly to either increase or decrease the available range of motion.

Returning to FIG. 2, a friction assembly 220 is provided on each adjustable mount 115 to ensure that the position of the adjustable mount is maintained at a desired angle after adjustment. The friction assembly 220 is composed of a friction rod 310, two friction shoes 315, a compression plate 320, and an adjustable handle 325. One end of the friction rod 310 is rotatably coupled to the back body portion 205 by passing the friction rod through a hole 330 and securing the end of the friction rod with a pushnut 335. The other end of the friction rod 310 is sandwiched between the two friction shoes 315. The friction shoes and the friction rod are secured to the front body portion 210 by a threaded stub on the compression plate 320 that passes through a hole 340 in the front body portion and is secured on the other side by the adjustable handle 325. By utilizing a threaded coupler to compress the friction shoes around the friction rod, a user gains a mechanical advantage over other methods. Turning the adjustable handle in one direction increases the amount of pressure that is applied to the friction rod by the friction shoes, as the compression plate compresses the friction shoes against the rod. Turning the adjustable handle in the other direction decreases the amount of pressure that is applied to the friction rod. A user of the mounting system is thereby able to adjust the amount of friction in order to gain a desired amount of friction in the friction assembly.

FIGS. 3A-3D depict the operation of the friction assembly 220 as the adjustable mount 115 extends from a retracted position to an extended position. As shown in FIG. 3A, when the adjustable mount is in the retracted position, the friction rod 310 is largely vertical and the friction shoes 315 compress the friction rod at a location past the midpoint on the friction rod as measured from the point where the friction rod is attached to the back body portion in FIGS. 3B and 3C, as the front body portion 210 is tilted away from the back body portion 205 the friction shoes travel along the friction rod, away from the attachment point to the back body portion in FIG. 3D, as the front body portion 210 reaches the extended position, the friction shoes approach the end of the friction rod. By appropriately tightening the friction assembly, a user is able to maintain enough friction in the assembly to keep the desired angle of the adjustable mount without having to tighten the adjustable handle after each use. Instead, the friction assembly only has to be tightened on a periodic basis as the component parts wear or as the handle and compression plate loosen through use. The friction assembly 220 offers several advantages over existing friction assemblies. For example, the friction rod can have an inexpensive and durable surface, the friction shoes can have large surface areas giving smooth and durable friction, and the compression plate tightens the friction shoes via a leveraged screw action that makes it easier to achieve a particular friction force as compared to traditional methods.

Returning to FIG. 2, the adjustable handle 325 for the friction assembly 220 is depicted as being installed on the left side of the adjustable mount 115 as viewed from the perspective of the user. Mounting the handle on the left side of the left adjustable mount ensures that a user will have easier access to the handle even after a flat panel display has been attached to the adjustable mounts. For similar reasons, the handle on the right adjustable mount is mounted on the right side of the adjustable mount. FIG. 1A depicts both a left and a right adjustable mount with friction assembly handles installed on the appropriate side of each assembly.

Figure 4:
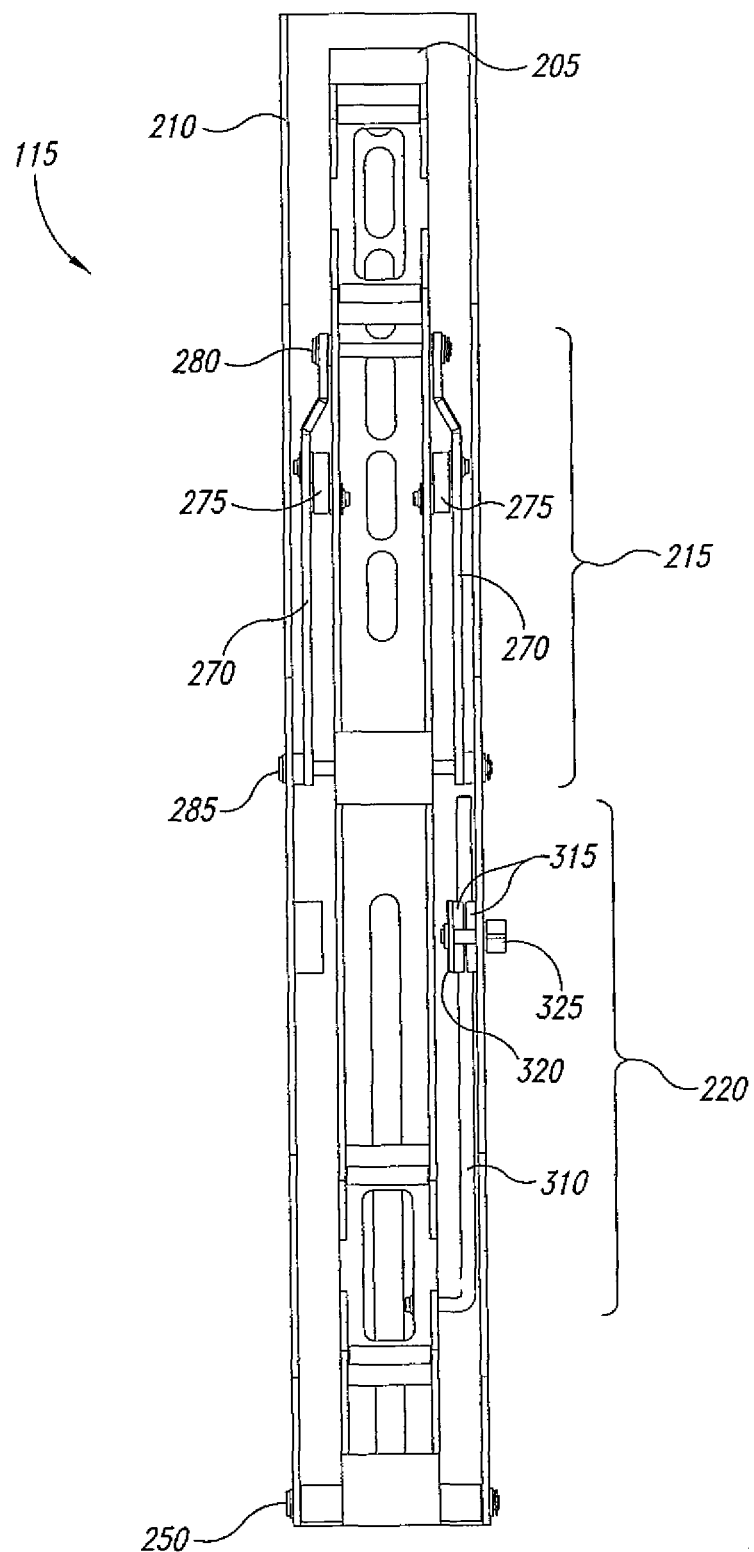
FIG. 4 is a front cross-sectional view of the adjustable mount of FIG. 2 in the retracted position.

FIG. 4 is a cross-section view of the adjustable mount 115 that depicts the layout of the components when the adjustable mount is in the retracted position. As shown in FIG. 4, both the linkage assembly 215 and the friction assembly 220 are designed in a manner so that they are contained in the space between the front body portion 210 and back body portion 205 of the adjustable mount when the adjustable mount is in the retracted position. The disclosed construction thereby allows the adjustable mount to fold nearly flat and maintain a minimum profile when installed.

It will be appreciated that utilizing pairs of linkages, including two first links 270 and two second links 275, distributes the supported weight of the attached flat panel display more evenly across the back body portion and the front body portion. Those skilled in the art will appreciate that under certain conditions the linkage assembly 215 may be constructed with a different number of linkages, such as a single first link and second link, or more than two first links and second links. Such construction may be applicable depending on the linkage material, size of the flat panel display, intended use of the mounting system, and other factors.

Returning to FIG. 1, two locking bars 130 are optionally provided with the mounting system 100. The locking bars may be screwed or otherwise fastened to the support medium in order to lock the horizontal movement of the adjustable mounts 115 with respect to the frame assembly 100. Locking the adjustable mounts in this fashion prevents unwanted lateral motion of the flat panel display 105 once a desired location has been selected.

While various embodiments are described above, those skilled in the art will appreciate that various changes to the mounting system may be made without departing from the scope of the invention. For example, various spacers, washers and other fastening mechanisms are depicted in the figures but not discussed herein for purposes of clarity. While many of the connection points have been represented as pins that pass through the front or back body portions of the assembly, the pins could be readily replaced with other couplers that allow the same motion at the connection points.

From the foregoing, it will be appreciated that specific embodiments of the invention have been described herein for purposes of illustration, but that various modifications may be made without deviating from the spirit and scope of the invention. For example, although several specific embodiments of the present invention are particularly useful for adjustably mounting flat panel displays, the mounting systems of the invention are not limited to displays and can be applied equally well in other applications including devices adjustably mounted and/or supported by a wall or other support structure. Additionally, the mounting assemblies can be mounted directly to a wall or other medium such that the frame assembly is not needed. In alternative embodiments, the back body portion may not be vertical, but rather the back body portion may be at an angle relative to vertical. Aspects of the invention described in the context of particular embodiments may be combined or eliminated in other embodiments. Further, while advantages associated with certain embodiments of the invention have been described in the context of these embodiments, other embodiments may also exhibit such advantages, and not all embodiments need necessarily exhibit such advantages to fall within the scope of the invention. The following examples provide further illustrations of embodiments of the invention.

The invention claimed is:

1. An adjustable mount for holding a flat panel display, comprising:
   a first portion defining a first slot, a second slot, and a first hole, wherein the first hole is positioned between the first slot and the second slot;
   a second portion that extends from a first end to a second end opposite the first end, the second end defining a second hole for receiving a pin, wherein the second portion has a direct sliding connection to the first portion and is tiltable relative to the first portion, the direct sliding connection including a pin passing through the second hole in the second portion, the pin also passing through the second slot in the first portion;
   a first link that has a sliding connection to the first portion via the first slot, and has a pivot connection to the second portion; and
   a second link that has a pivot connection to the first link and a pivot connection to the first portion via the first hole, wherein the second hole for receiving the pin moves in a substantially vertical direction when the second portion is tilted relative to the first portion.

2. The adjustable mount of claim 1, wherein
   the first portion is configured to be mounted to a support medium, and
   the second portion is configured to be mounted to the flat panel display.

3. The adjustable mount of claim 2, wherein
   the support medium includes a rail, and
   the second portion includes a flange that fits to the rail.

4. The adjustable mount of claim 1, wherein
   the sliding connection of the first link to the first portion includes a pin that moves within a range of motion defined by the first slot.

5. The adjustable mount of claim 1, wherein the second portion is sized to encompass the first portion and the first and second links in a retracted position.

6. An adjustable mount for mounting a flat panel display to a support medium comprising:
   a back body portion that is configured to be mounted to the support medium, the back body portion defining a first slot, a second slot, and a first hole, wherein the first hole is positioned between the first slot and the second slot;
   a front body portion that is configured to be mounted to the flat panel display, the front body portion extending from a first end to a second end opposite the first end, the second end defining a second hole for receiving a pin, wherein the front body portion has a direct sliding connection to the back body portion and is tiltable relative to the back body portion, the direct sliding connection including a pin passing through the second hole in the front body portion, the pin also passing through the second slot in the back body portion;
   a first link that has a sliding connection to the back body portion and a pivot connection to the front body portion; and
   a second link that has a pivot connection to the first link and a pivot connection to the back body portion via the first hole, wherein the second hole for receiving the pin moves in a substantially vertical direction when the front body portion is tilted relative to the back body portion.

7. The adjustable mount of claim 6, wherein
   the support medium includes a rail, and
   the back body portion includes a flange that fits to the rail.

8. The adjustable mount of claim 6, wherein
   the sliding connection of the first link to the back body portion includes a pin that moves within a range of motion defined by the first slot.

9. The adjustable mount of claim 6, wherein the front body portion is sized to encompass the back body portion and the first and second links in a retracted position.

10. An adjustable mount for holding a display, comprising:
    a first portion defining a first slot, a second slot, and a first hole, wherein the first hole is positioned between the first slot and the second slot;
    a second portion that extends from a first end to a second end opposite the first end, the second end defining a second hole for receiving a pin, wherein the second portion has a direct sliding connection to the first portion and is tiltable relative to the first portion, the direct sliding connection including a pin passing through the second hole in the second portion, the pin also passing through the second slot in the first portion; and
    a linkage that has a sliding connection to the first portion via the first slot, and has a pivot connection to the second portion, wherein the second hole for receiving the pin moves in a substantially vertical direction when the second portion is tilted relative to the first portion.

11. The adjustable mount of claim 10, wherein
    the first portion is configured to be mounted to a support medium, and
    the second portion is configured to be mounted to the display.

12. The adjustable mount of claim 11, wherein
    the support medium includes a rail, and
    the second portion includes a flange that fits to the rail.

13. The adjustable mount of claim 10, wherein
the sliding connection of the linkage to the first portion includes a pin that moves within a range of motion defined by the first slot.

14. The adjustable mount of claim 10, wherein the second portion is sized to encompass the first portion and the linkage in a retracted position.

15. An adjustable mount for holding a display, comprising:
a first portion defining a first slot, a second slot, and a first hole, wherein the first hole is positioned between the first slot and the second slot;
a second portion that extends from a first end to a second end opposite the first end, the second end defining a second hole for receiving a pin, wherein the second portion has a direct sliding connection to the first portion and is tiltable relative to the first portion, the direct sliding connection including a pin passing through the second hole in the second portion, the pin also passing through the second slot in the first portion;
a first linkage that has a sliding connection to the first portion via the first slot, and has a pivot connection to the second portion; and
a second linkage that has a pivot connection to the first linkage and a pivot connection to the first portion via the first hole, wherein the second hole for receiving the pin moves in a substantially vertical direction when the front body portion is tilted relative to the back body portion.

16. The adjustable mount of claim 15, wherein
the first portion is configured to be mounted to a support medium, and
the second portion is configured to be mounted to the display.

17. The adjustable mount of claim 16, wherein
the support medium includes a rail, and
the second portion includes a flange that fits to the rail.

18. The adjustable mount of claim 15, wherein
the sliding connection of the first linkage to the first portion includes a pin that moves within a range of motion defined by the first slot.

19. The adjustable mount of claim 15, wherein the second portion is sized to encompass the first portion and the first and second linkages in a retracted position.

20. An adjustable mount for mounting a flat panel display to a support medium comprising:
a back body portion that is configured to be mounted to the support medium, the back body portion defining a first slot, a second slot, and a first hole, wherein the first hole is positioned between the first slot and the second slot;
a front body portion that extends from a first end to a second end opposite the first end, the second end defining a second hole for receiving a pin, wherein the front body portion is configured to be mounted to the flat panel display, has a direct sliding connection to the back body portion and is tiltable relative to the back body portion, the direct sliding connection including a pin passing through the second hole in the front body portion, the pin also passing through the second slot in the back body portion;
a first linkage that has a sliding connection to the back body portion and a pivot connection to the front body portion; and
a second linkage that has a pivot connection to the first linkage and a pivot connection to the back body portion via the first hole, wherein the second hole for receiving the pin moves in a substantially vertical direction when the front body portion is tilted relative to the back body portion.

21. The adjustable mount of claim 20, wherein
the support medium includes a rail, and
the back body portion includes a flange that fits to the rail.

22. The adjustable mount of claim 20, wherein
the sliding connection of the first linkage to the back body portion includes a pin that moves within a range of motion defined by the first slot.

23. The adjustable mount of claim 20, wherein the front body portion is sized to encompass the back body portion and the first and second linkages in a retracted position.

* * * * *